Patented Nov. 28, 1922.

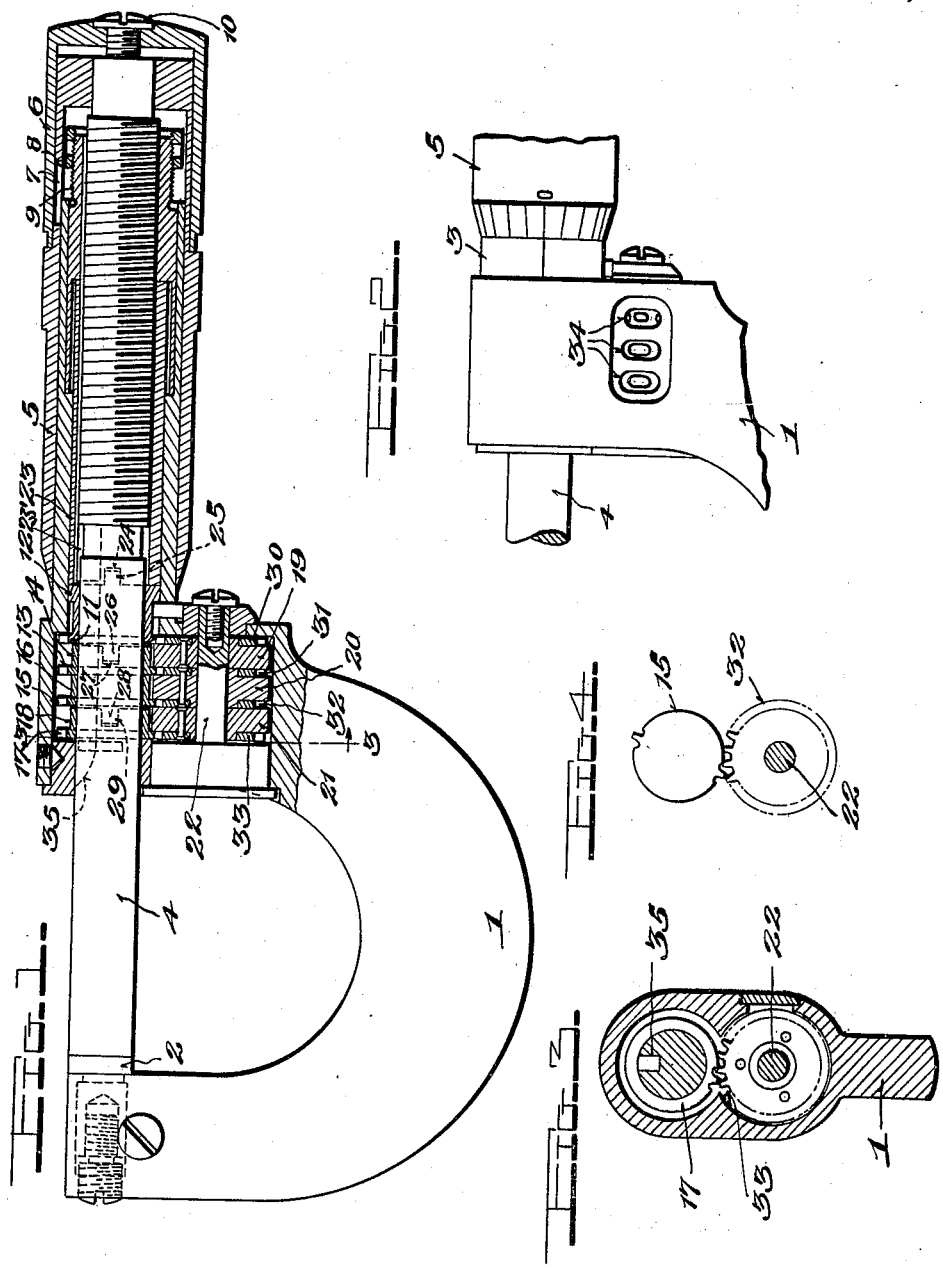

1,437,352

UNITED STATES PATENT OFFICE.

JOHN W. PARKER, OF BARRINGTON, RHODE ISLAND, ASSIGNOR TO BROWN & SHARPE MFG. CO., OF PROVIDENCE, RHODE ISLAND.

DIRECT OR SIGHT READING MICROMETER.

Application filed January 21, 1922. Serial No. 530,874.

*To all whom it may concern:*

Be it known that I, JOHN W. PARKER, a citizen of the United States, residing at Barrington, in the county of Bristol and State of Rhode Island, have invented new and useful Improvements in a Direct or Sight Reading Micrometer, of which the following is a specification.

This invention relates to certain new and useful improvements in a direct or sight reading micrometer and it has for its primary object to provide an improved counting or registering mechanism to indicate correctly the position of the micrometer screw whereby the reading may be obtained at a glance.

The invention further has for an object to simplify the construction whereby wear of the micrometer screw or spindle, and its associated parts, may be readily taken up without the necessity of dismantling the complete tool.

The invention also has for a still further object to simplify the construction of the registering mechanism to facilitate and expedite the assembling of the component parts thereof.

Further objects will appear as the description progresses, and those features of construction and arrangements and combinations of parts on which protection is desired will hereinafter be set forth in detail and succinctly claimed, reference being had to the accompanying drawing, wherein, Figure 1 is a side elevation, partly in vertical section of a micrometer embodying the present invention;

Figure 2 is a fragmentary side elevation depicting the registering mechanism;

Figure 3 is a vertical transverse section on line 3—3 of Figure 1; and

Figure 4 is a similar diagrammatic section through the plane of gear 13.

The general form of the improved micrometer is ordinary, embodying a yoke 1 having the usual anvil 2 at one end and the barrel or bearing 3 at the opposite end for slidably and rotatably supporting the screw threaded spindle or micrometer screw 4, said screw extending throughout the entire length of the barrel and having the outer reading shell 5 secured thereto, as is also the auxiliary shell 6. The shell 5 is rotatably mounted on the barrel 3 and is provided with an opening 7 which is normally closed by the shell 6, the purpose of said opening being to permit access to a nut 8 provided on the screw 9 for tightening the inner parts. Therefore, as wear occurs and it becomes necessary to take up the wear it is only necsesary to remove the screw 10 along with the auxiliary shell 6, which it secures in place, whereupon a wrench may be inserted through the opening 7 for adjusting the nut 8, thereby avoiding the dismantling of a considerable portion of the micrometer which is necessary in the old types.

The registering mechanism comprises a disk 11 having a hub 12, a disk 13 having a hub 14, a disk 15 provided with a hub 16, and a disk 17 equipped with a hub 18, all mounted on the spindle 4 for operating the registering or counting wheels 19, 20, and 21, said wheels being journaled on a counter shaft 22, as clearly depicted in Figures 1 and 3. A sleeve 23 is connected to the screw 4 by the key 23' and is provided with a recess 24 in its forward end to receive a tongue 25 projecting from hub 12 thereby constituting a separable connection between the hub and sleeve which permits ready assembling of said parts. The disk 11 is provided with a tongue 26 engaging in a recess 27 in hub 14, and the disk 15 is likewise provided with a tongue 28 engaged in a recess 29 in hub 18, such connections rendering the assembling of the several parts a very easy operation in which accuracy is assured after the initial arrangement of the first disk. The disks 11, 13, 15 and 17 function as gears, the disks 11 and 15, in the present instance, being designed to contain twenty teeth, the gears 13 and 17 carrying two teeth and one tooth respectively. These gears mesh with gears 30, 31, 32 and 33 respectively, secured to the numbering wheels, the central wheel 20 having two gears 31 and 32 fixed thereto so that the drive of the registering mechanism will be as follows:—

Rotary movement of sleeve 23 by reason of its connection to the screw 4 by the key 23' is imparted to numbering wheel 19 through the tongue and notch connection 24, 25, and hub 12, the gears 11 and 30, which latter is fixed to the wheel 19. The tongue and notch connection 26, 27 transmits the rotary movement of gear 11 to gear 13 which latter has only two teeth, as diagrammatically shown in Figure 4 and therefore imparts a step-by-step movement to gear 31 which is carried by number wheel 20. Consequently every revolution of gear 13 will rotate the wheel 20 two notches and this movement is transmitted through gear 32, gear 15 and the tongue and notch connection 28, 29 to gear 17 which has only one tooth and thereby imparts a step-by-step movement to the gear 33 and its connected wheel 21, one movement for every revolution of gear 17.

The number wheels carry numerals on their peripheries for successive display through the windows 34 provided in the casing by the yoke member to receive the registering mechanism.

In operation, adjustment of the spindle 4, by turning shell 5, is transmitted through the several parts, as set forth, to rotate the wheel 19 continuously and to intermittently rotate the wheels 20 and 21, the intermittent motion of wheel 20 occurring twice to every single movement of wheel 21.

The foregoing construction is simple and durable; is readily assembled and dismantled; and is positive in its action throughout. While the parts have been described in detail it is obvious that changes in construction may be readily resorted to, as defined by the appended claims, without departing from the spirit of the invention. The micrometer spindle is provided with the key way 35 and the floating key 23' for the purpose of connecting the sleeve 23 with the screw 4 to cause rotation of the sleeve 23 and its connecting parts, as well as the purpose of assembling the parts.

Having thus described my invention, what I claim as new and desire to secure by Letters Patent is:—

1. A micrometer comprising a frame having a spindle bearing therein, a micrometer spindle mounted in the bearing, a shell secured to the spindle and supported by the bearing, said shell having an opening therein, a radial auxiliary shell fitting over the first shell to close the opening therein, and a wear take-up device within the first shell and including an adjusting nut accessible through the opening in the shell.

2. A micrometer comprising a frame having a spindle bearing therein, a micrometer spindle mounted in the bearing, a shell secured to the spindle and supported by the bearing, a gear mounted on the spindle within the bearing to be rotated by said shell, a second gear mounted on the spindle and having a tongue and notch connection with the first gear, and a pair of counting wheels each provided with a gear meshing respectively with the first and second gears.

3. A micrometer comprising a frame having a spindle bearing therein, a micrometer spindle mounted in the bearing, a shell secured to the spindle and supported by the bearing, a gear mounted on the spindle within the bearing to be rotated by said shell, a second gear mounted on the spindle and having a tongue and notch connection with the first gear, and a pair of counting wheels each provided with a gear meshing respectively with the first and second gears, said second gear being mutilated to intermittently operate its respective wheel gear.

4. A micrometer comprising a frame having a spindle bearing therein, a micrometer spindle mounted in the bearing, a shell secured to the spindle and supported by the bearing, a gear mounted on the spindle within the bearing to be rotated by said shell, a second gear mounted on the spindle and having a tongue and notch connection with the first gear, said second gear being provided with two diametrically arranged teeth, a plurality of counting wheels journaled in the frame and having gears certain of which mesh with the first and second gears, a third gear mounted on the spindle and meshing with a gear carried by the wheel which is driven from the second gear, and a one-toothed gear journaled on the spindle and connected to the wheel-driven gear, said one-toothed gear meshing with a gear carried by a third counting wheel.

5. A micrometer comprising a frame having a spindle bearing therein, a micrometer spindle mounted in the bearing, a shell secured to the spindle and supported by the bearing, a gear mounted on the spindle within the bearing to be rotated by said shell, a second gear mounted on the spindle and having detachable connection with the first gear, a third gear mounted on the spindle to rotate independently of the first two gears, a fourth gear mounted on the spindle and detachably connected to the third, said second and fourth gears having a different number of teeth from each other and from the first and third gears, and counting wheels journaled in the frame and geared to the aforesaid gears whereby on rotating the spindle one counting wheel will be driven continuously and the other counting wheels intermittently at varying intervals.

6. A micrometer comprising a frame, having a spindle bearing, a micrometer spindle mounted in the bearing and formed with a longitudinal key way and a screw end portion, an operating nut element cooperating with the screw end portion, a shell surrounding the spindle in the bearing, a floating key slidable in the key way of the spindle and connecting the latter to the shell, and a registering device operable by the shell.

7. A micrometer comprising a frame having a spindle bearing formed at one end with an enlargement constituting a chamber, a spindle mounted in the bearing and formed with a longitudinal key way, an annular member surrounding the spindle in the bearing, a key slidable in the key way and connecting the spindle to the annular member, and an annular registering member through which the spindle passes and mounted in the chamber.

8. A micrometer comprising a frame having a spindle bearing formed with an enlargement constituting a chamber open at one end, a spindle mounted in the bearing and formed with a longitudinal key way normally extending into the chamber, a shell surrounding the spindle in the bearing, a key slidable in the key way and connecting the shell to the spindle, registering mechanism in the chamber removable through the open end thereof and detachably coupled to the shell, and a closure for the chamber to confine the mechanism therein and to normally close the adjacent end of the key way.

9. A micrometer comprising a frame having a spindle bearing formed at one end with an enlargement constituting a chamber, a spindle mounted in the bearing and formed with a longitudinal key way normally extending into the chamber, a shell surrounding the spindle in the bearing, a key slidable in the key way and connecting the shell to the spindle, a toothed disk having a hub detachably connected to the shell, said connection being effected simply by positioning the disk in the chamber about the spindle, and registering mechanism operable by the disk.

10. A micrometer comprising a frame having a spindle bearing formed at one end with an enlargement constituting a chamber, a spindle mounted in the bearing and formed with a longitudinal key way normally extending into the chamber, a shell surrounding the spindle in the bearing, a key slidable in the key way and connecting the shell to the spindle, a toothed disk having a hub detachably connected to the shell, a countershaft, registering members journaled on the latter and provided with toothed parts, other toothed disks journaled on the spindle within the chamber and operating with the first disk to actuate the registering members, and a closure for the chamber operating to retain the disks in position.

In testimony whereof I have signed my name to this specification in the presence of two subscribing witnesses.

JOHN W. PARKER.

Witnesses:
M. A. KINGSLEY,
J. A. MILLER.